United States Patent
West

[15] 3,655,958
[45] Apr. 11, 1972

[54] APPARATUS FOR AUTOMATICALLY PERFORMING THE LEAST SQUARES APPROXIMATION TO THE STANDARD ADDITION METHOD OF ANALYSIS

[72] Inventor: Charles David West, Hacienda Heights, Calif.

[73] Assignee: Beckman Instruments Inc.

[22] Filed: June 25, 1970

[21] Appl. No.: 49,671

[52] U.S. Cl....................235/151.35, 235/151.12, 235/180, 235/193
[51] Int. Cl.........................................G06g 7/58, G06g 7/14
[58] Field of Search...................235/151.35, 180, 183, 193, 235/151.12; 250/41.9 G; 73/61, 61.1 R, 61.1 C; 23/230 R, 230 A, 232 R, 232 C, 232 E, 253 A, 254 E, 255 E

[56] References Cited

UNITED STATES PATENTS

| | | | |
|---|---|---|---|
| 3,242,327 | 3/1966 | Burk et al. | 235/151.35 X |
| 3,473,008 | 10/1969 | Bay et al. | 235/151.12 |
| 3,005,911 | 10/1961 | Burhans | 250/41.9 G |
| 3,500,028 | 3/1970 | Killian | 235/151.35 X |
| 3,027,086 | 3/1962 | Hargens et al. | 235/151.35 |
| 3,154,678 | 10/1964 | Burns | 235/180 |
| 3,553,444 | 1/1971 | Tong | 235/151.35 |

Primary Examiner—Malcolm A. Morrison
Assistant Examiner—Jerry Smith
Attorney—Paul R. Harder and Robert J. Steinmeyer

[57] ABSTRACT

An analyzer is connected to a processor into which a standard parameter is added in equal increments of known value to a process having a sample containing an unknown value of the standard parameter. A programmed timer is connected to a standard parameter dispenser and to the processor to initiate the parameter addition and analysis of the process by the analyzer respectively. In response to each parameter addition, the analyzer generates an electrical signal. A multiplicity of relay armatures are connected to the analyzer output to apply the signals from the analyzer in a predetermined sequence to each of a multiplicity of operational amplifiers connected as storage devices. Each of the outputs of the amplifiers are in turn connected to another plurality of armatures which connect each of the amplifier outputs in a specified combination to one of two summing amplifiers. The summing amplifiers are connected to a ratio indicator to display the ratio of the two amplifier outputs as the unknown value of the standard parameter contained in the sample.

8 Claims, 3 Drawing Figures

INVENTOR.
CHARLES DAVID WEST

| TIME INTERVALS | ADD STD | ANALYZE SAMPLE | $S_1$ | | $S_n$ | RATIO |
|---|---|---|---|---|---|---|
| $0 - T_1$ | NO | YES | CLOSE | | 0 | INDICATE PRIOR READING |
| $T_1 - T_2$ | YES | NO | 0 (OPEN) | | 0 | SAME |
| | | | | | | |
| $T_{2n-2} - T_{2n-1}$ | NO | NO | 0 | | CLOSE | UPDATE |
| $T_{2n-1} - T_{2n}$ | NO | NO | 0 | | 0 | INDICATE |

APPARATUS FOR AUTOMATICALLY PERFORMING THE LEAST SQUARES APPROXIMATION TO THE STANDARD ADDITION METHOD OF ANALYSIS

The present invention relates to the mathematical solution to an unknown function of a given variable by a straight line approximation obtained by using the least squares approximation and more particularly to automatically determining the unknown concentration of a known element in a sample by the standard addition method.

In the field of emission and absorption spectrochemistry, it has been the general practice to employ three methods of converting intensity measurements to meaningful concentrations. The simplest method consists of determining the net signal given by several known concentrations of the element to be determined, thereby constructing a calibration curve. The signal developed by an unknown concentration is then obtained and this concentration determined from the calibration curve.

The second method, known as the internal standard method, consists of adding a known amount of some element not contained in the unknown solutions to both the sample and standard solutions, and plotting the ratio of the two signals versus concentration. If the internal standard element is chosen with care, it is possible to reduce errors caused by variations in spray rates, changes in drop size, variations in viscosity and surface tension, and changes due to pressure regulation of the atomizer used to introduce the sample into the analyzer flame. Unfortunately, the method does not generally compensate for changes in excitation conditions of the flame or, more importantly, for the presence of interfering ions. These interferences are especially troublesome in clinical analyses.

The third method which often compensates for changes in excitation conditions and for the presence of interfering ions is called the standard addition method. There are many procedures which have been developed to implement the standard addition method. One of these procedures involves adding equal volumes of the sample to a series of standard solutions containing different known quantities of test elements all diluted to the same volume. The emission intensities of the resulting solutions are then determined and plotted versus the concentration of the standard solutions. From the slope and intercept of the line, the unknown concentration can be calculated. Another procedure adds fixed known amounts of a standard solution in a serial manner to a given volume of sample. The emission intensities are determined after each addition and plotted versus the amount of the standard solution added to the sample. The amount of unknown is then calculated as before. The standard addition method tends to be the most accurate of the three but it also may be the most time consuming.

Those concerned with the development of analyzers for determining the concentration of unknown elements by emission or absorption spectroscopy, polarography and photometry have long recognized the need for automated apparatus to perform the various steps employed by the above methods. Although apparatus has been developed for automating the second or internal standard method described above for use in a clinical flame photometer, it has not proved entirely satisfactory under all conditions of service for the reason that considerable difficulty has been experienced in compensating for the various interferences encountered. The need for apparatus implementing the standard addition method has long been recognized to perform the multiplicity of steps of this method. The present invention fulfills this need.

In the field of mathematical synthesis, it has been the general practice to employ manual methods and general purpose computers to perform the steps of synthesizing an equation for an unknown function by a straight line approximation utilizing the least squares method. Although manual methods have served the purpose, considerable time is required in carrying out the many steps. The use of general purpose computers for such a limited application has proved unsatisfactory because of the considerable cost experienced in both the hardware and software areas. These problems are overcome by the present invention.

The general purpose of this invention is to provide analog computing apparatus which embraces all the advantages of similarly employed manual methods, computers and analyzers for the solution of the value of a parameter in an unknown function and possesses none of the aforedescribed disadvantages. To attain this, the present invention contemplates a unique operational amplifier and relay circuit arrangement in the form of an analog computer whereby the time consuming manual methods and the expense of general purpose computers and programming are avoided.

An object of the present invention is the provision of analog computing apparatus for the solution of an unknown function by a linear approximation using the least squares method.

Another object is to provide relay and operational amplifier components arranged in a circuit for computing the initial value of a first parameter by measuring values of a second dependent parameter which is a function of the first parameter, in response to incremental increases produced in the first parameter.

Yet another object of the present invention is the provision of apparatus for automating the standard addition method in emission spectrochemistry.

Still another object is to provide apparatus for converting intensity measurements obtained in emission or absorption spectroscopy to meaningful concentrations of an element in a given sample.

Other objects and many of the attendant advantages of this invention will be readily appreciated as the same becomes better understood by reference to the following detailed description when considered in connection with the accompanying drawings in which like numerals designate like parts throughout the figures thereof and wherein:

FIG. 2 illustrates a chart showing the relationship of events and time for the general embodiment of FIG. 1.

Figure 1:
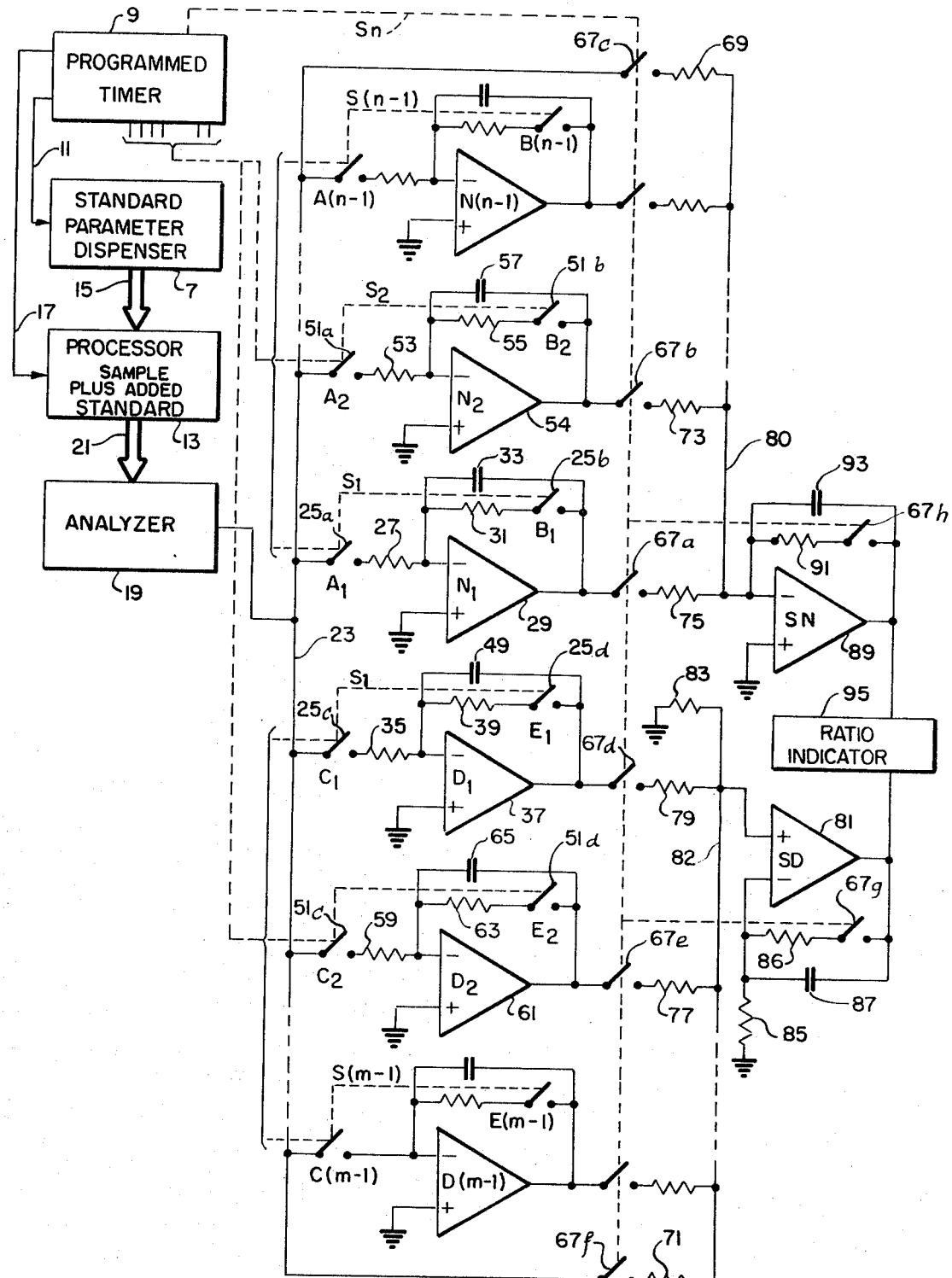
FIG. 1 illustrates a block and circuit diagram of a general embodiment of the present invention.

Turning now to FIG. 1, standard parameter dispenser 7 is controlled by programmed timer 9 over line 11 to add a certain incremental value of standard parameter to processor 13 through a connection indicated by arrow 15. Programmed timer 9 is also connected by line 17 to processor 13 to initiate the analysis of the sample plus added standard by analyzer 19 connected to processor 13 as indicated by arrow 21. The output of analyzer 19 is connected to bus 23 which in turn is connected to two groups of relay armatures or switches $A_1$–$A_{(n-1)}$ and $C_1$–$C_{(m-1)}$. The armatures or switches can be of a mechanical, electronic, or semiconductor variety or be any device wherein an electrical conducting path can be closed or opened in a controlled manner. Relay armatures $A_1$ and $A_2$ are designated as elements 25a and 51a respectively and armatures $C_1$ and $C_2$ are designated as elements 25c and 51c respectively. It is to be noted that $m$ and $n$ are not necessarily equal and can be of different values as required.

Since relay armatures or switches $A_1$–$A_{(n-1)}$ connect similar circuits to bus 23, the structure of only one circuit will be described. When closed, $A_1$ relay armature 25a connects bus 23 to resistor 27. The other end of resistor 27 is connected to the inverting input of $N_1$ operational amplifier 29. The noninverting input of $N_1$ amplifier 29 is connected to ground. Capacitor 33 is connected between the output and inverting input of $N_1$ amplifier 29. Resistor 31 is connected in series with $B_1$ relay armature 25b and the series combination is connected in parallel with capacitor 33. Relay armatures 25a and 25b are part of the same relay and are operated in unison. The output of $N_1$ amplifier 29 is connected to relay armature 67a which when closed connects the output of $N_1$ amplifier 29 to resistor 75. Resistor 75 is in turn connected to bus 80. Therefore, between bus 23 and bus 80 there are ($n-1$) operational amplifier signal storage circuits which are similar in structure to that described in respect to $N_1$ amplifier 29, which ($n-1$) circuits are all connected in parallel between buses 23 and 80. The number, function and variations of these circuits will become apparent during the discussion of operation.

Also in parallel with this first group of $N_1$-$N_{(n-1)}$) amplifiers and associated circuitry, is a direct connection from bus 23 to relay armature 67c which when closed connects bus 23 to resistor 69 which in turn is connected to bus 80.

A second group of amplifier circuits having circuit structure similar to that described above with respect to amplifier 29, is connected between bus 23 and bus 82. The only substantial difference in the circuit structure of the second group of circuits as compared to the first group of ($n-1$) circuits is that a different number of amplifier circuits, ($m-1$), may be employed.

Describing one circuit of the second group of ($m-1$) circuits, $C_1$ relay armature 25c, from the group of relay armatures $C_1$-$C_{(m-1)}$, connects bus 23 to resistor 35 when $C_1$ armature 25c is closed. Resistor 35 in turn is connected to the junction of resistor 39, capacitor 49 and the inverting input of $D_1$ operational amplifier 37. Capacitor 49 in turn is connected to the output of $D_1$ amplifier 37. Resistor 39 is connected in series with $E_1$ relay armature 25d, the series combination being connected in parallel with capacitor 49. When $E_1$ relay armature 25d is closed, resistor 39 is connected from the input to the output of $D_1$ amplifier 37 and also in parallel with capacitor 49. $C_1$ and $E_1$ relay armatures, 25c and 25d, respectively are operated in unison.

The output of $D_1$ amplifier 37 is connected to relay armature 67d, which when closed, connects amplifier 37 to bus 82 through resistor 79.

Therefore, between bus 23 and bus 82 there are ($m-1$) operational amplifier signal storage circuits which are similar in structure to $D_1$ amplifier 37, which ($m-1$) circuits are connected in parallel between buses 23 and 82.

A direct connection is provided from bus 23 to relay armature 67f, which when closed connects bus 23 through resistor 71 to bus 82.

Although the operational amplifier circuits of $N_1$ amplifier 29 and $D_1$ amplifier 37 are shown as inverting amplifiers, it is contemplated within the objectives of the present invention to use noninverting amplifier circuits as the mathematical solution may require.

Bus 82 is further connected to resistor 83 and also to the noninverting input of SD operational amplifier 81. The noninverting input of SD amplifier 81 is connected through resistor 85 to ground. Capacitor 87 is connected from the output of SD amplifier 81 to the noninverting input. Resistor 86 is connected in series with relay armature 67g and the series combination is connected in parallel with capacitor 87. The output of SD amplifier 81 is further connected to one input of ratio indicator 95. Ratio indicator 95 may be a ratio strip-chart recorder widely used with radiant energy analyzers.

Bus 80 is further connected to the inverting input of SN operational amplifier 89 of which the noninverting input is connected to ground. Capacitor 93 is connected from the inverting input to the output of SN amplifier 89. Connected in parallel with capacitor 93 is resistor 91 in series with relay armature 67h. The output of SN amplifier 89 is further connected to another input of ratio indicator 95.

It should be noted with respect to the operation of the relay armatures that all the relays are controlled by programmed timer 9. $A_1$ and $B_1$ relay armatures are operated in unison as are $A_2$ and $B_2$ and so on to $A_{(n-1)}$ and $B_{(n-1)}$. Similarly armatures $C_1$ and $E_1$ are operated in unison as are $C_2$ and $E_2$ and so on to $C_{(m-1)}$ and $E_{(m-1)}$. Armatures identified by the designation 67 with a letter subscript are all operated in unison by timer 9.

Before turning to the detailed operation of the invention embodied in the apparatus of FIG. 1, it is helpful first to discuss the mathematical relations upon which the apparatus is based. Assume a complex function or process which is monitored by measuring a dependent variable $y$ as a function of an independent variable $x$. It is always possible to approximate the function or process over certain ranges by a straight line, $=a+bx$. This approximation can be made even for highly nonlinear functions if the range over which the approximation is made is limited. The constants $a$ and $b$ in a linear equation can be determined by putting known values for $x$ into the equation and then calculating $y$ while putting the same values of $x$ into the function or process and measuring the resulting value of $y$. After a sufficient number of measurements and calculations have been obtained, corresponding to the accuracy desired, the least squares method can be applied to determine the values of $a$ and $b$.

To find $a$ and $b$ by the least squares method the following summation is performed:

$$\sum_{i=1}^{n} y_i - y(x_i)^2 = f(a, b)$$

where $y_i$ is the value of $y$ measured for a value $x_i$ inserted into the process or function, $y(x_i)$ is the value of $y$ computed from the equation $y = a + bx$ by substituting the value of $x_i$ for $x$ in the equation and $n$ is the number of measurements. The next step is to determine the partial derivative of the above summation with respect to $a$ keeping $b$ constant and the partial derivative with respect to $b$ keeping $a$ constant then to set the partial derivatives equal to zero and solve for $a$ and $b$ from the two simultaneous equations. Determining $a$ in this manner, $a = y - bx$ where $y$ is the average of all the measurements of $y$ and $x$ is the average of all the values of $x$ set into the process or function. Solving for $b$, $$b = \frac{n\bar{x}\bar{y} - (x_1y_1 + x_2y_2 + \ldots x_ny_n)}{n\bar{x}^2 - 2(x_1^2 + x_2^2 + \ldots x_n^2)}$$

where $n$ is the $n$th measurement.

Applying the above method to determining concentrations in emission and absorption spectroscopy, the value of $a/b$ is desired since this is the value of the initial concentration of $x$ in the solution before the solution is changed by adding known values of $x$ as discussed above in the least squares method of solution. Letting $c = a/b$, $$c = \frac{\bar{x}(x_1y_1 + \ldots x_ny_n) - \bar{y}(x_1^2 + \ldots x_n^2)}{n\bar{x}\bar{y} = (x_1y_1 + \ldots x_ny_n)}$$

Therefore, $c$ represents the unknown concentration of a known element in a sample. Heretofore it was necessary to record each value of $x_i$ inserted into the process or function and to record each corresponding measured value of $y_i$. When a sufficient number $n$ of measurements had been obtained the equation for $c$ was manually solved to obtain the initial concentration of the element $x$ in the solution.

The embodiment of the present invention illustrated in FIG. 1 enables the determination of $c$ without the recording of any data, automatically, without any need for calculation on the part of the operator. Although the equations have been described in terms of the application to emission and absorption spectroscopy, it is clear that the embodiment of the invention in FIG. 1 is applicable to other processes and functions.

Turning now to FIG. 1, standard parameter dispenser 7 contains increments of known standard values of a first parameter. These increments in parameter value are dispensed into processor 13 containing a process or function wherein an unknown value of the first parameter is present in a sample. These increments of standard values of the first parameter are dispensed periodically under the direction of program timer 9. Also under the direction of program timer 9, the sample plus the added increments of standard values are periodically analyzed by analyzer 19 to obtain a second parameter which is an unknown function of the first parameter.

The time sequence of dispensing and analyzing is illustrated in FIG. 2 wherein time interval 0–$T_1$ the program timer directs the sample to be analyzed prior to any addition of a standard value of the first parameter. In time interval $T_1-T_2$ an increment of standard value is added to the process sample. In time interval $T_2-T_3$ the program timer again directs the sample to be analyzed. In time interval $T_3-T_4$ another increment of the standard is added to the sample and in time interval $T_5-T_6$ the sample is again analyzed. This process is repeated again under the direction of the program timer until the number of measurements set into the program timer have been obtained.

Each time the analyzer 19 analyzes a sample, an electrical signal proportional to the second parameter is generated on bus 23 related to that analysis. Therefore, a sequence of signals appears on bus 23 corresponding to values of the second parameter determined by each sample analysis directed by the program timer 9.

To explain the operation of the relay armatures and operational amplifier circuits, it is useful to examine specific examples. Assume for the first example that two measurements are required to determine the straight line approximation. This involves a first measurement of the sample before any standard is added and a second measurement of the sample after an increment of standard has been added. Letting the increment of standard be represented by $x_0$ and the first measurement of the sample solution be $y_1$ and the second measurement be $y_2$, then $$c = \frac{x_0 y_1}{y_2 - y_1}.$$

This equation is solved by the apparatus in FIG. 1 in the following manner. In time interval $0-T_1$ a signal $y_1$ is generated on bus 23. As indicated in the table of FIG. 2 for $n = 2$, relay armatures 25a and 25b indicated by $S_1$ in the table are closed, connecting signal $y_1$ to the operational amplifier circuit of $N_1$ amplifier 29. A voltage is developed across capacitor 33 and at the output of $N_1$ amplifier 29 equal to $$-(y_1 R_{31})/R_{27}$$

with respect to ground. The minus sign results from the inversion of $N_1$ amplifier 29. At the end of time interval $0-T_1$ relay armatures 25a and 25b are opened thereby holding the voltage on capacitor 33. Therefore, capacitor 33 acts as a storage element to store the voltage thereon for future use.

Simultaneous with the closure of armatures 25a and 25b, armatures 25c and 25d associated with $D_1$ amplifier 37 are closed, thereby establishing a similar voltage across capacitor 49 and at the output of $D_1$ amplifier 37 equal to $$-(y_1 R_{39})/R_{35},$$

where the minus sign is obtained by the inversion of $D_1$ amplifier 37. At the end of time interval $0-T_1$, capacitor 49 similarly holds the voltage impressed thereon when armatures 25c and 25d are opened.

In time interval $T_1-T_2$ an increment $x_0$ of standard solution is added to the sample. In time interval $T_2-T_3$ relay armature 67f, indicated by $S_n$ in the table of FIG. 2, where $n = 2$, is closed connecting signal $y_2$ appearing on bus 23 through resistor 71 to the noninverting input of SD amplifier 81. The signal $y_2$ coupled by armature 67f will be of opposite sign with the output of $D_1$ amplifier 37. Simultaneously therewith relay armatures 67d and 67a, indicated by $S_n$ in the table of FIG. 2, are closed connecting the output of $D_1$ amplifier 37 through resistor 79 to the noninverting input of SD amplifier 81 and the output of $N_1$ amplifier 29 through resistor 75 to the noninverting input of SN amplifier 89 respectively. Relay armature 67h, part of $S_n$ indicated in the table of FIG. 2, is also closed simultaneously with relay armature 67a such that the output of SN amplifier 89 and the voltage appearing across capacitor 93 is equal to $$(y_1 R_{31} R_{91})/(R_{27} R_{75}),$$

where the minus sign occurring from the inversion of both $N_1$ amplifier 29 and SN amplifier 89 cancel. The resistance factor multiplying $y_1$ in the above equation, may be given a value equal to $x_0$.

Similarly, the output of SD amplifier 81 is equal to a resistance multiplying factor times the $(y_2 - y_1)$. The resistances may be chosen such that the resistance factor is equal to unity. Therefore, the signals applied to ratio indicator 95 are $x_0 y_1$ and $y_2 - y_1$ and the ratio indicated will be $$c = \frac{x_0 y_1}{y_2 - y_1}$$

which is the concentration of the element $x$ in the sample at the start of the analysis. Other choices of value for the resistance factors may be made if the ratio of the $y_1$ factor to the $(y_2 - y_1)$ factor is always maintained equal to $x_0$.

When relay armatures 67a, d, f, g and h are opened, the voltage stored on capacitor 87 and 93 is applied to ratio indicator 95 and held until a new ratio indicator is desired.

For the second example, let the number of measurements $n$ of the parameter $y$ associated with the sample be 3, such that the concentration of the element being measured is equal to $$c = \frac{x_0(5y_1 + 2y_2 - y_3)}{3(y_3 - y_1)}$$

In this example two standard addition solutions are made to the sample during the measurement process where each of these additions are of the same known amount $x_0$ of the element being measured.

Figure 3:
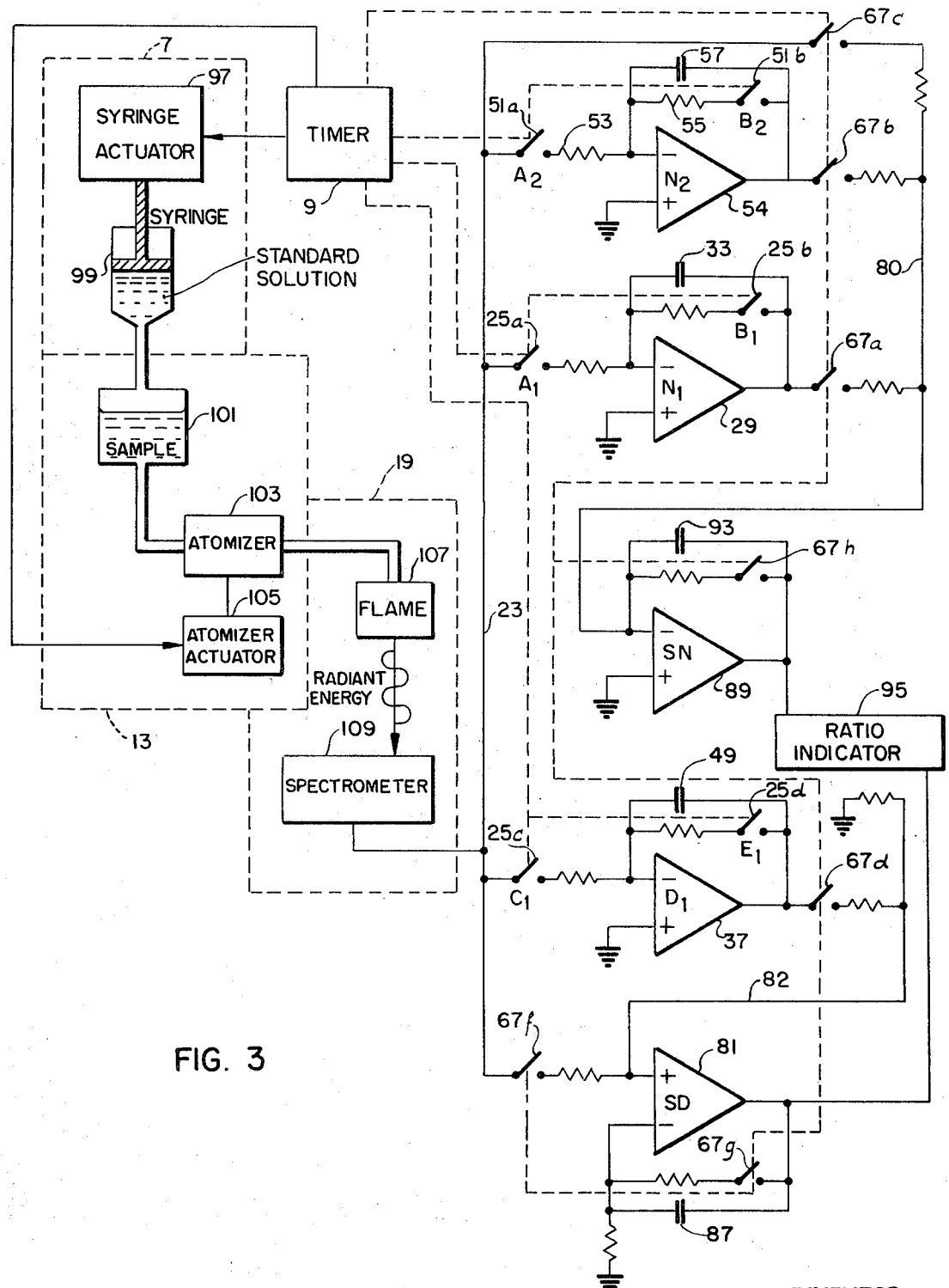
FIG. 3 illustrates a specific embodiment of the present invention as applied to emission and absorption spectroscopy.

FIG. 3 illustrates a specific embodiment of the second example. Syringe actuator 97 and syringe 99 comprise standard parameter dispenser 7 of FIG. 1. When actuated by timer 9, syringe actuator 97 causes syringe 99 to dispense a fixed volume of known concentration of the standard solution of the element being measured into sample 101. Atomizer or aspirator 103 is actuated by atomizer actuator 105 in response to a command from timer 9 to introduce a fixed portion of the sample into emission flame 107. Sample 101, atomizer 103 and atomizer actuator 105 comprise processor 13 of FIG. 1. Radiant energy related to the element being measured is selected and detected by spectrometer 109 to produce an electrical signal on bus 23. Emission flame 107 and spectrometer 109 comprise analyzer 19 of FIG. 1.

Since only three measurements are required, only $N_1$ amplifier 29, $N_2$ amplifier 54 and relay armature 67c along with SN amplifier 89 and associated circuit components are required to form the numerator of the desired ratio. For the denominator, only $D_1$ amplifier 37 and relay armatures 67f along with SD amplifier 81 and associated circuit components are required to form the denominator of the desired ratio. Therefore, only the required circuits are set forth in FIG. 3.

Turning now to FIG. 2, during time interval $0-T_1$ the sample is analyzed before the addition of any standard solution to obtain the measurement $y_1$ which appears as electrical signal on bus 23 in FIG. 3. During this time interval the $S_1$ relay armatures 25a–25d are closed such that both $N_1$ amplifier 29 and $D_1$ amplifier 37 are connected to place corresponding voltages on capacitors 33 and 49 respectively. Similar to the first example, the resistance values are chosen to obtain the desired gain for each amplifier, thereby obtaining the correct multiplying factor for the measurement $y_1$.

During time interval $T_1-T_2$, an $x_0$ amount of the element being measured is added from the standard solution to the sample with all relay armatures open.

During time interval $T_2-T_3$, signal $y_2$ is generated on bus 23 during which time the $S_2$ relay armatures 51a and 51b, associated with $N_2$ amplifier 54, are closed. $N_2$ amplifier 54 places a voltage on capacitor 57 related to the signal $y_2$ by the ratio of resistor 55 to resistor 53. At the end of period $T_2-T_3$ relay armatures 51a and 51b are opened to store the voltage on capacitor 57.

At time interval $T_3-T_4$ another increment $x_0$ of standard solution is added to the sample. Following this addition and during time interval $T_4-T_5$, the sample is analyzed and a signal $y_3$ is generated on bus 23. During this time interval, the $S_n$ relay armatures 67a, 67b, 67c, 67d and 67f are closed, where $n = 3$, thereby summing and differencing the various signals to the input to SN amplifier 89 and SD amplifier 81 respectively. Relay armatures 67g and 67h are also closed such that capacitors 87 and 93 are charged to the desired voltages. The armatures 67a, b, c, d, f, g and h are then opened to store the voltage on capacitors 87 and 93. By having selected the values of resistors associated with the various operational amplifiers to determine their gain by methods well known to those skilled in the art, the output of SN amplifier 89 during time interval $T_5$–$T_6$ will be the numerator of the equation for $c$, namely $x_0(5y_1+2y_2-y_3)$. Similarly, the output of SD amplifier 81 will be the denominator of the equation for $c$, namely, $3(y_3-y_1)$. Applying these signals to ratio indicator 95, the concentration $c$ is determined.

If four measurements are desired for the parameter $y$, portions of the circuit set forth in FIG. 1 may be selected similarly to the manner discussed in connection with the second example illustrated in FIG. 3 to obtain a concentration $c$ from ratio indicator 95 of $$c = \frac{x_0(7y_1+4y_2+y_3-2y_4)}{3y_4+y_3-y_2-3y_1}$$

It should be realized that although the $N_1$–$N_{(n-1)}$ and $D_1$–$D_{(n-1)}$ amplifiers are illustrated as inverting operational amplifiers, it is understood that any one of these amplifiers may be a noninverting amplifier as required by the sum and difference demands set forth in the equation for $c$. For example, it is noted in the above equation that $y_2$ in the denominator has a minus sign in addition to the term $3y_1$. It will be necessary, as one of several alternatives, to make the amplifier for the storage of signal $y_3$ a noninverting amplifier, the amplifiers for storage of $y_2$ and $3y_1$ inverting amplifiers and to have the signal $3y_4$ to be directly coupled by relay armature 67f to accomplish the sum and difference functions required. Therefore, it is contemplated, within the illustrated embodiment in FIG. 1, to use operational amplifier circuitry resulting in signal inversion or noninversion as required. A typical noninverting operational amplifier is illustrated by SD amplifier 81.

The embodiment of the present invention illustrated in FIG. 1 provides two groups of operational amplifier summing and differencing circuitry from which a ratio of two quantities is derived. By selection of appropriate component values and amplifier configurations the various signals being processed can be given the desired magnitude and sign required for the desired mathematical solution. It should be pointed out that although the discussion of operation of the embodiment illustrated in FIG. 1 was restricted to the addition of equal increments $x_0$ of standard solution, other unequal but known incremental additions may be utilized by adjusting the gains of the amplifiers associated with the signal corresponding to a given incremental addition.

Although the volumes of the sample and the added standard have not been discussed at length, it should be apparent that the addition of fixed amounts of the standard to the sample or dispensing portions of the sample into the analyzer, thereby changing the net volume of the sample plus standard, does not affect the performance of the present invention. As long as the increments of the standard added to the sample are equal or if different, are known and compensated for as disclosed above, the method and apparatus disclosed herein will provide the correct solution for the unknown.

It now should be apparent that the present invention provides a circuit arrangement which may be employed in conjunction with the least squares approximation to the standard addition method of analysis of the type used in emission or absorption spectroscopy for automatically determining the unknown concentration of an element in a sample. The ratio of two quantities is determined from two groups of analog summing and differencing circuits which operate in a serial manner upon a sequence of signals generated in response to a programmed analysis of the sample corresponding to programmed additions of a standard solution parameter.

Although particular components and circuit arrangements have been discussed in connection with a specific embodiment of a signal processing circuit constructed in accordance with the teachings of the present invention, others may be utilized. Furthermore, it will be understood that although an exemplary embodiment of the present invention has been disclosed and discussed, other applications and circuit arrangements are possible and that the embodiments disclosed may be subjected to various changes, modifications and substitutions without necessarily departing from the spirit of the invention.

What is claimed is:

1. Apparatus for determining the initial value of a given parameter in a process by measuring a function of the parameter in a sample of the process and approximating the function by a known relation, comprising:
   analyzing means responsive to the function of the parameter in the sample for generating a signal;
   a standard parameter dispenser means for adding to the sample a multiplicity of known increments of the given parameter one increment at a time;
   storage means connected to said analyzing means for storing a first signal from said analyzing means generated in response to the initial value of the parameter in the sample prior to the addition of said increments and for storing each of a multiplicity of signals from said analyzing means generated in response to each added increment;
   combining means connected to said storage means for adding and subtracting selected combinations of the stored signals to approximate the function by the known relation according to a mathematical method of least squares approximation, said combining means providing first and second output signals, the ratio of said output signals being the parameter initial value; and
   ratio indicating means connected to said combining means for determining the ratio of said first and second output signals.

2. The apparatus defined in claim 1 wherein said analyzing means is a spectrophotometer into which portions of the sample are introduced to produce a radiant energy spectrum characteristic of the mixture with the given substance and which produces an electrical signal proportional to said radiant energy spectrum.

3. The apparatus defined in claim 2 wherein said standard parameter dispenser is a calibrated syringe and said standard parameter is a standard solution of known concentration.

4. The apparatus defined in claim 3 wherein said storage means comprises:
   a multiplicity of integrating operational amplifiers for storing each of the multiplicity of signals;
   a multiplicity of relay armatures sequentially connecting each of said multiplicity of integrating operational amplifiers to said spectrophotometer to store each of said multiplicity of signals.

5. The apparatus defined in claim 4 wherein said combining means comprises at least two summing operational amplifiers one of which is connected to a selected portion of said integrating operational amplifiers, the other being connected to the remainder of said integrating operational amplifiers, said operational amplifiers combining the signals stored by each integrating amplifier in an additive manner.

6. The apparatus defined in claim 4 further comprising a programmed timer for activating said standard parameter dispenser and said analyzer means in synchronism with said multiplicity of relay armatures to sequentially generate and store said multiplicity of signals.

7. In a spectrophotometer of the type wherein the concentration of a given element in a sample is determined by the standard addition method utilizing the least squares approximation, the improvement comprising:
   a multiplicity of input switches;
   means connecting said switches to said spectrophotometer for conducting to said switches a sequence of a multiplicity of signals generated by said spectrophotometer in response to the standard addition method of analysis;
   a multiplicity of operational integrating amplifiers each being connected to one of said switches, one of said integrating amplifiers being actuated to store one of said multiplicity of signals when one of said input switches is closed to connect one of said signals to said one of said integrating amplifiers;

a multiplicity of output switches each of a portion thereof being connected to the output of one of said multiplicity of operational integrating amplifiers, said multiplicity of output switches being divided into first and second groups, each of said groups having at least one of the switches in addition to said portion thereof connected to said connecting means;

first and second summing amplifiers each providing an output equal to the sum and difference of signals applied to the input, respectively;

means for connecting said first group of output switches to said first summing amplifier and for connecting said second group of output switches to said second summing amplifier; and, ratio indicator means connected to the outputs of said first and second summing amplifiers for indicating the ratio of the output signal of said first summing amplifier to the output signal of said second summing amplifier.

8. The spectrophotometer defined in claim 7 further comprising timing means programmed in accord with the least squares approximation to the standard addition method for actuating said input switches in time sequence corresponding to the sequence of signals generated by said spectrophotometer, and for actuating each of said integrating amplifiers to store a corresponding one of said sequence of signals, said timing means actuating said first and second groups of output switches simultaneously at the completion of said sequence of signals to connect the respective signals thereon to the first and second summing amplifiers respectively.

* * * * *